United States Patent Office 3,410,608
Patented Nov. 12, 1968

3,410,608
HYDRAULIC BRAKING SYSTEM INCORPORATING TWO HYDRAULIC FLUID CIRCUITS WITH A PRESSURE LIMITER
Jean G. Cadiou, Paris, France, assignor to Societe Anonyme Andre Citroen, Paris, France, a French society
Filed Dec. 27, 1966, Ser. No. 605,073
Claims priority, application France, Jan. 3, 1966, 44,663
3 Claims. (Cl. 303—6)

ABSTRACT OF THE DISCLOSURE

A hydraulic braking system for an automobile comprising front and rear hydraulic fluid circuits and a brake control valve for regulating the fluid to said circuits, pressure supply and limiting means operable in dependence upon rear axle load and regulating the pressure supply to the rear brake and an additional brake applying means in the front brake and means for supplying fluid to the additional brake from the pressure limiter, the additional brake means and rear brake circuit being connected through the pressure limiter and a safety device provided with a distributor slide valve operable in one of its end positions to isolate the limiter valve from the additional brake applying means and the rear brake surface.

---

In automobile vehicles, hydraulic braking systems are already known which comprise two separate hydraulic circuits, one allocated to the front axle and the other to the rear axle. It is also known that this latter circuit can be provided with a member that limits the application pressure of the jacks, i.e. the hydraulic brake cylinders associated with the brake linings, in dependence upon the load on the rear axle.

Safety devices have also been proposed which act to guard against the breaking of a pipe in one or the other circuit caused by resisting the force of the brake fluid under pressure.

The invention has for an object a hydraulic braking system incorporating the various members referred to above, wherein said members are connected together so as to improve the safety provisions of the system and wherein means are provided to render the braking effort required of the driver substantially constant for the purpose of obtaining a given deceleration, whatever be the load of the vehicle.

To this end, according to the invention, there is added to the jacks or hydraulic cylinders applying the brake linings of the front axle supplied by the front circuit, at least one additional application member supplied by the rear circuit provided with the pressure limiter.

The additional application member mounted on the front axle and the jacks or hydraulic cylinders for applying the brake linings on the rear axle are connected to a source of fluid under pressure of the rear circuit and to the pressure limiter by means of a safety device provided with a distributor slide-valve which, in one of its extreme positions, isolates this limiter from the front additional application member and the rear application jacks or brake cylinders.

Figure 1:
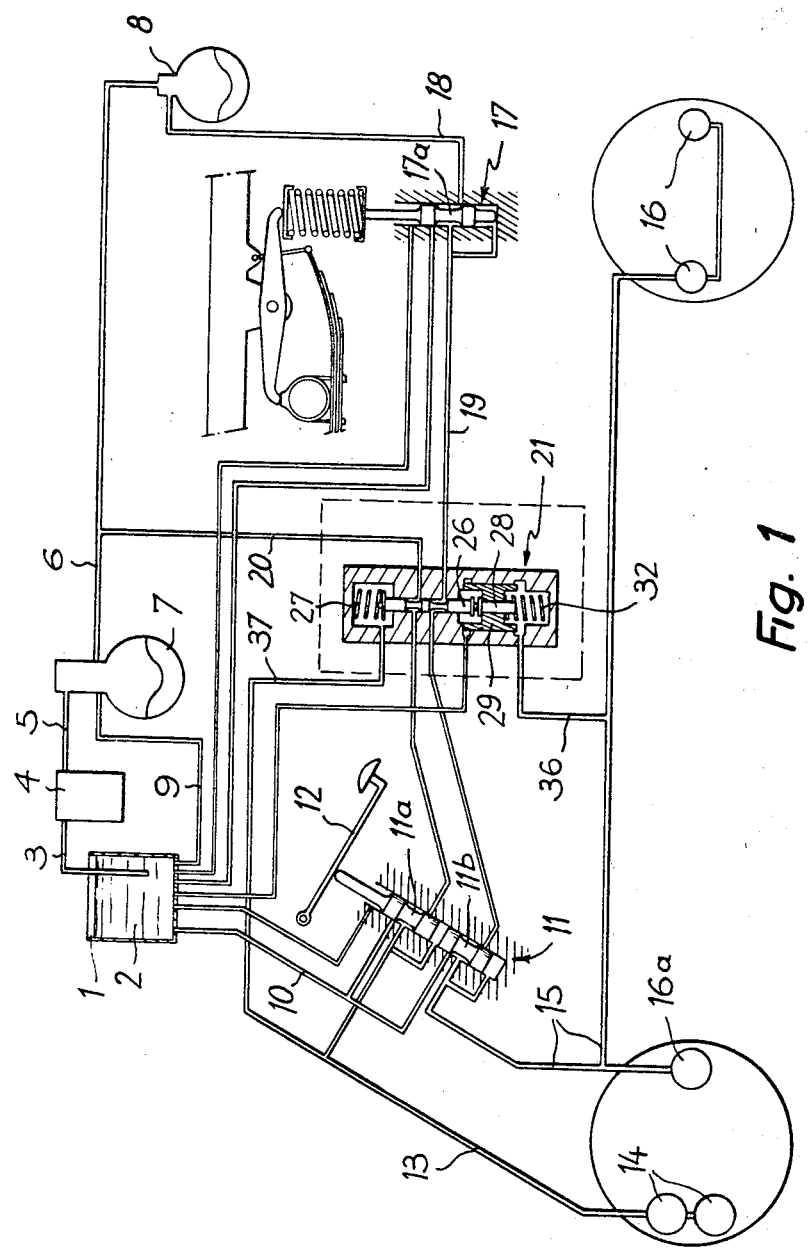
Figure 2:
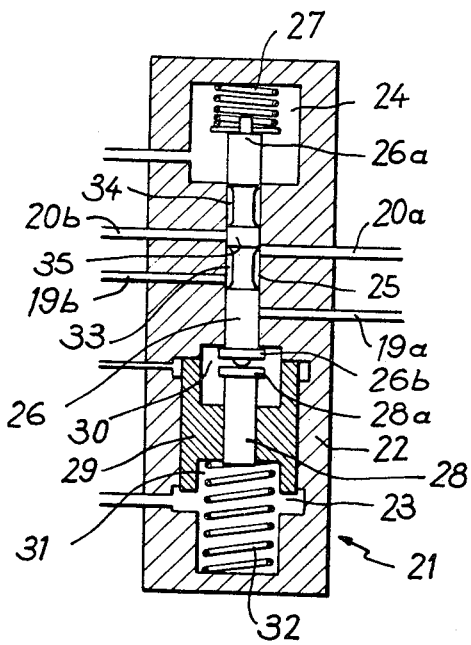
Figure 3:
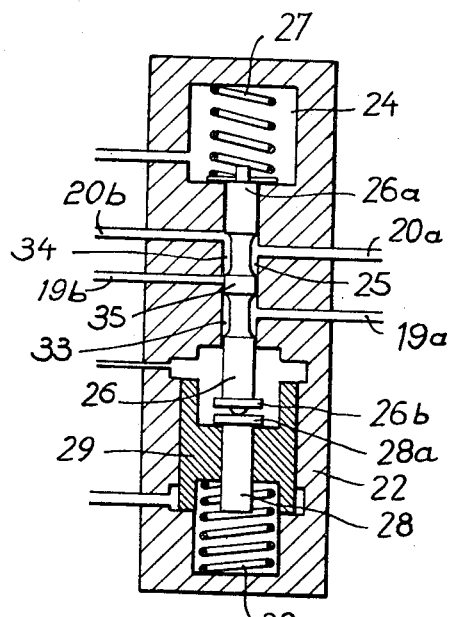

The invention will be more readily understood and secondary characteristics as well as its advantages will appear from the description of an embodiment given hereinbelow, reference being made to the accompanying drawings in which:

FIGURE 1 is a schematic view of one embodiment of system according to the invention with certain members shown in section, FIGURE 2 is a sectional view through the longitudinal axis of the safety device incorporated in the system of FIGURE 1, shown in one end position, and FIGURE 3 is a view similar to FIGURE 2, the device being shown in its other end position.

The system shown in FIGURE 1 comprises a plurality of members which are already known per se and therefore need not be described in detail.

A reservoir 1 contains a hydraulic fluid 2 which can be exhausted through a pipe 3 by a high pressure delivery pump 4. Pipes 5 and 6 convey the fluid from the pump 4 to accumulators 7 and 8 connected by an overflow pipe 9 to the reservoir 1.

Another pipe 10 connects the reservoir 1 to a distributor 11, controlled by a pedal 12 and having two slide valves 11a, 11b. The slide valve 11a is connected by a pipe 13 to the front braking circuit comprising the jacks 14 or hydraulic braking cylinder for applying the brake linings of the front axle.

The slide valve 11b is connected by a pipe 15 to the rear braking circuit comprising the jacks or hydraulic braking cylinders 16 for applying the brake linings of the rear axle and moreover a jack or cylinder 16a which, although being part of the rear circuit, is in fact mounted on the wheels of the front axle. This jack or cylinder 16a constitutes an additional and auxiliary member for applying the front brake linings, and the action of which is added to that of the main jacks or cylinders 14 of the front circuit.

Of course, the invention does not limit the relative value of the force nor the number of the supplementary application members which can be mounted on the front axle and which are supplied with fluid by the rear circuit.

The rear circuit also comprises a pressure limiter 17 associated with the rear axle. This limiter acts essentially, due to a piston 17a, as a stop-valve for the rear braking circuit when the pressure which prevails in this latter reaches a sufficient value for counter-balancing the load carried by the rear axle. Such a pressure limiter 17 is described in detail in French Patent No. 1,418,792 filed by Societe Anonyme Andre Citroen on Jan. 24, 1964.

The present invention moreover does not impose the use of this precise type of braking pressure limiter. Limiters of another type could serve in place of the limiter 17 adopted in this embodiment.

The pressure accumulator 8 is connected, by a pipe 18, to the pressure limiter 17 which is itself connected through a tube 19 to the part 11b of the distributor 11, in the same way as the pressure accumulator 7 is connected through a pipe 20 to the part 11a of the distributor 11.

There is inserted in the run of the pipes 19 and 20 a safety device 21 which consequently divides them into two sections, viz. upstream sections 19a and 20a and downstream section 19b and 20b (FIG. 2).

The safety device 21 is composed of a cylinder 22 having two end chambers 23 and 24 connected by a passage 25 of circular cross-section in which a piston 26 is arranged to slide.

One end 26a of the piston 26, exposed in the chamber 24, is pushed back by a spring 27. The other end 26b of the piston 26 is supported against a rod 28 which has a flange 28a at one end. This flange 28a bears on the end face of a sleeve 29 provided with a central bore in which the rod 28 is engaged.

The sleeve 29 occupies one part of the chamber 23. It has at its two ends a recess 30 and 31 respectively. The recess 31 guides the end of a compression spring 32 which bears on the other hand against the base of the cylinder 22. The lower end face of the sleeve 29 is exposed in the chamber 23 as is the free end of rod 28.

In its median part, the piston 26 has two grooves 33 and 34 on either side of a central bulge 35. This assembly constitutes a distributor slide valve which communicates or isolates as the case may be the pipe sections 19a, 19b, 20a, 20b which open out at this location into the passage 25.

When the safety device 21 is in the neutral or rest position, as shown in FIGURE 1, the section 20a communicates with the section 20b and the section 19a with section 19b.

Moreover, the chamber 23 is connected by a pipe 36 to the pipe 15 of the rear circuit whilst the chamber 24 is connected by a pipe 37 to the pipe 13 of the front circuit.

The operation of the device is as follows:

When the pedal 12 is pushed down, the part 11a of the distributor 11 conveys fluid under pressure to the jacks or cylinders 14 of the front circuit; at the same time, the part 11b sends fluid to the rear braking circuit comprising the jacks or cylinder 16 of the rear axle and the jack or cylinder 16a of the front axle.

The pressure in the rear circuit is limited by the limiter 17 to a value which depends on the load carried by the rear axle; however, this limit of the application pressure also affects, in part the front axle by reason of the existence of the additional jack or cylinder 16a.

With a small load, the application pressure of the jacks or cylinders 16 and 16a is limited to a small value; it is thus necessary to exert on the pedal 12 a certain force in order to obtain a given deceleration. With a heavy load, the application pressure of the jacks or cylinders 16 and 16a is no longer limited and the front brakes acts fully, as does the rear brake. The same deceleration as previously is obtained for a substantially equal force applied to the pedal 12.

It is possible to calculate the different members of the system so that the braking torque is substantially constant for a given deceleration of the vehicle, whatever its load may be.

Under the normal conditions of operation, the pressures applied prevailing respectively in the front and rear circuits, in the chambers 24 and 23 of the safety device 21, on the end faces of the piston 26, more exactly of the piston 26 on the one hand and the rod 28 and the sleeve 29 on the other hand, hold this piston 26 substantially in a neutral position.

In the case where there is a break or a loss on one or the other of the circuits, the pressure in the corresponding chamber 23 or 24 would become zero or sufficiently low for the piston 26 to be displaced by the pressure of the circuit which has remained intact.

FIGURES 2 and 3 show the position taken by the piston 26 respectively in the case of a drop in pressure in the front circuit and in the rear circuit.

FIGURE 2 shows that the pipe section 20a is isolated from the section 20b and placed in communication with the section 19b whilst the section 19a is isolated. The front circuit which is assumed to be defective is no longer supplied with fluid; the pressure accumulators 7 and 8 are directly connected to the rear circuit, without the intermediary of the pressure limiter 17.

FIGURE 3 shows that the pipe section 20a is always in communication with the section 20b but the section 19a and 19b are isolated from one another so that the rear circuit, assumed to be defective, is no longer supplied.

It will be apparent that the safety device 21 not only ensures the isolation of the defective circuit but that it also puts the pressure limiter 17 out of operation when the rear circuit remains the only one available for braking the vehicle. It is in fact very desirable that, under these circumstances, the application force can reach its maximum value, even if the load on the rear axle is light.

It will be clear that the relative disposition of the members may be varied as desired.

I claim:

1. In a hydraulic braking system for an automobile vehicle, comprising front and rear hydraulic fluid circuits, one for the front brake and the other for the rear brake including a brake control valve for regulating the fluid to said front and rear brake circuits; a pressure supply and a pressure limiter operable in dependence upon rear axle load for regulating said pressure supply to said rear brake; the improvement which consists in an additional brake applying means in said front brake and means for supplying fluid to said additional brake applying means from said pressure limiter.

2. A braking system according to claim 1, wherein said additional brake applying means and said rear brake circuit are connected to a source of hydraulic pressure fluid through said pressure limiter and a safety device provided with a distributor slide valve operable, in one of its end positions, to isolate said limiter valve from said additional brake applying means and said rear brake circuit.

3. A system according to claim 2, wherein said safety device comprises a cylinder and a movable piston therein, having end faces respectively exposed to the pressure of the fluid in said front and rear circuits, the central part of said piston comprising a distributor slide valve which in one end position connects said supply to said front circuit, in the other end position connects said limiting valve to said rear circuit and said additional means, and in neutral position connects said front circuit to said supply and said rear circuit and additional means to said limiting valve.

References Cited
UNITED STATES PATENTS 3,289,796  12/1966  Cadiou _____ 188—152

FERGUS S. MIDDLETON, *Primary Examiner.*

J. J. McLAUGHLIN, *Assistant Examiner.*